United States Patent
Lee et al.

(10) Patent No.: US 9,432,102 B2
(45) Date of Patent: Aug. 30, 2016

(54) APPARATUS AND METHOD FOR ELIMINATING INTER CELL INTERFERENCE IN MULTIPLE INPUT MULTIPLE OUTPUT WIRELESS COMMUNICATION SYSTEM

(75) Inventors: Sang-Woo Lee, Seoul (KR); Hee-Won Kang, Seongnam-si (KR); Shuangfeng Han, Suwon-si (KR); David Mazzarese, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1025 days.

(21) Appl. No.: 12/907,291

(22) Filed: Oct. 19, 2010

(65) Prior Publication Data

US 2011/0092232 A1    Apr. 21, 2011

(30) Foreign Application Priority Data

Oct. 20, 2009  (KR) .......................... 10-2009-0099797

(51) Int. Cl.
| H04B 1/00 | (2006.01) |
| H04B 7/06 | (2006.01) |
| H04B 15/00 | (2006.01) |
| H04B 17/327 | (2015.01) |
| H04B 17/345 | (2015.01) |

(52) U.S. Cl.
CPC ........... *H04B 7/0639* (2013.01); *H04B 17/327* (2015.01); *H04B 17/345* (2015.01)

(58) Field of Classification Search
CPC ............. H04W 72/082; H04W 72/02; H04W 72/0453; H04W 72/0406; H04W 28/18; H04B 7/024; H04B 7/0413; H04B 1/69; H04B 7/0639; H04B 17/345

USPC ........... 455/63.1, 68, 69, 501, 550.1, 452.2, 455/443, 452.1; 370/252
See application file for complete search history.

(56) References Cited

U.S. PATENT DOCUMENTS

| 5,317,593 A | * | 5/1994 | Fulghum et al. ............. 370/342 |
| 2007/0287464 A1 | * | 12/2007 | Hamamoto et al. .......... 455/447 |
| 2008/0057996 A1 | * | 3/2008 | Sung et al. ................... 455/522 |

(Continued)

FOREIGN PATENT DOCUMENTS

| KR | 10-0753369 B1 | 8/2007 |
| KR | 10-2007-0094333 A | 9/2007 |

(Continued)

OTHER PUBLICATIONS

Rahman et al., "Interference Avoidance with Dynamic Inter-Cell Coordination for Downlink LTE System," IEEE WCNC 2009, Apr. 8, 2009.

*Primary Examiner* — Ayodeji Ayotunde
(74) *Attorney, Agent, or Firm* — Jefferson IP Law, LLP

(57) ABSTRACT

Provided is a device and a method for eliminating inter-cell interference in Multiple Input Multiple Output (MIMO) wireless communication system. The method for operating a user equipment for eliminating the inter-cell interference includes determining one or more optimum bands among bands not requested to be restricted from a neighboring cell, determining at least one of band and Precoding Matrix Index (PMI) to be requested to be restricted to the neighboring cell among the determined one or more optimum bands, and feeding back at least one of the band and PMI to be requested to be restricted to the neighboring cell to a serving base station.

22 Claims, 13 Drawing Sheets

(56) References Cited

U.S. PATENT DOCUMENTS

| | | | |
|---|---|---|---|
| 2009/0103486 A1* | 4/2009 | Hunukumbure et al. | 370/329 |
| 2009/0181708 A1* | 7/2009 | Kim et al. | 455/501 |
| 2009/0191906 A1* | 7/2009 | Abedi | 455/501 |
| 2010/0008317 A1* | 1/2010 | Bhattad et al. | 370/329 |
| 2010/0035555 A1* | 2/2010 | Bala et al. | 455/63.1 |
| 2010/0124181 A1* | 5/2010 | Hosein | 370/252 |
| 2010/0208610 A1* | 8/2010 | Ihm et al. | 370/252 |
| 2011/0009142 A1* | 1/2011 | Higuchi | 455/509 |
| 2011/0034192 A1* | 2/2011 | Lim et al. | 455/501 |
| 2011/0268068 A1* | 11/2011 | Jian | H04B 7/024 370/329 |
| 2012/0163228 A1 | 6/2012 | Sung et al. | |

FOREIGN PATENT DOCUMENTS

| | | |
|---|---|---|
| KR | 10-2008-0074419 A | 8/2008 |
| KR | 10-2009-0073974 A | 7/2009 |
| KR | 10-2009-0103671 A | 10/2009 |
| KR | 10-2010-0005575 A | 1/2010 |

* cited by examiner

APPARATUS AND METHOD FOR ELIMINATING INTER CELL INTERFERENCE IN MULTIPLE INPUT MULTIPLE OUTPUT WIRELESS COMMUNICATION SYSTEM

PRIORITY

This application claims the benefit under 35 U.S.C. §119(a) to a patent application filed in the Korean Intellectual Property Office on Oct. 20, 2009 and assigned Serial No. 10-2009-0099797, the entire disclosure of which is incorporated herein by reference.

BACKGROUND OF THE INVENTION

1. Field of the Invention

The present invention relates to a Multiple Input Multiple Output (MIMO) wireless communication system. More particularly, the present invention relates to a device and a method for eliminating inter-cell interference in a MIMO wireless communication system.

2. Description of the Related Art

As the demand for high quality data transfer with high speed has increased, Multiple Input Multiple Output (MIMO) technology, which uses a plurality of transmitting and receiving antennas, has received increasing attention as one of technologies for satisfying the demand. According to the MIMO technology, communication is performed using a plurality of channels due to the plurality of antennas so that a channel capacity may be improved in comparison with a single antenna system.

The MIMO technology is divided into Closed Loop (CL) MIMO and Open Loop (OL) MIMO according to whether channel information of user equipment is used when a transmission beam pattern is formed. In the case of the CL MIMO, the user equipment feedbacks the channel information to a base station, and the base station forms an appropriate transmission beam based on the channel information to transmit a signal. In the case of the OL MIMO, there is no feedback of the channel information, and thus the base station uses one fixed beam pattern or a plurality of fixed beam patterns regardless of channel state.

As one method of embodying the CL MIMO, a method of feeding back a codebook vector index or a codebook matrix index is widely used. According to the above-mentioned method, a codebook including codebook vectors is predefined. Herein, each codebook vector has a direction which maximizes a gain in space. According to the method, the user equipment provides the codebook vector index or codebook matrix index which maximizes Signal to Noise Ratio (SNR) to the base station. In other words, the user equipment measures a channel using a training signal received from the base station and selects a beamforming vector satisfying a desired SNR. Thereafter, the user equipment feedbacks an index of the selected beamforming vector, i.e., a beam index, to the base station, and the base station transmits a signal using the beam index fed back to the user equipment. Accordingly, a high SNR may be achieved and throughput may be maximized.

However, since all base stations use the same codebook, in the case where neighboring base stations transfer data using the same frequency band, the user equipment positioned at a boundary of a cell may be interfered due to the beam index used by a neighboring cell user equipment positioned at the boundary of the neighboring cell. For instance, in the case where the direction of the beamforming vector used for a base station A to transfer data to a user equipment A positioned at the cell boundary using a first frequency band and that of the beamforming vector used for a base station B to transfer data to a user equipment B positioned at the cell boundary using the first frequency band are overlapped, signals received by the user equipments A and B mutually interfere with each other.

To address such a problem, standards organizations and scholars have been conducting research on technology for controlling Inter-Cell Interference (ICI) through cooperation between base stations. The technology of cooperation between base stations is referred to using different names according to the standards organizations. The technology of cooperation between base stations is referred to as Coordinated Multiple Point Transmission/Reception (CoMP) technology in the $3^{rd}$ Generation Partnership Project (3GPP) Long Term Evolution-Advanced (LTE-A) standard, and it is referred to as multi-cell MIMO technology in the Institute of Electrical and Electronics Engineers (IEEE) 802.16m standard.

The CoMP technology is roughly divided into Coordinated Beamforming (CB) technology and Joint Processing/Transmission (JP) technology. According to the CB technology, like a conventional single-cell MIMO technology, a traffic data for a single user equipment is transmitted from a single base station. Accordingly, the CB technology does not need packet sharing between cells. However, reception SNR increasing technology such as transmission combining cannot be used. On the contrary, according to the JP technology, the traffic data for the single user equipment is transmitted from two or more base stations. In this case, the SNR may be increased using the reception SNR increasing technology, but the packet sharing between cells is needed.

As a representative example of the CB technology, there is Precoding Matrix Index (PMI) coordination technology. According to the PMI coordination technology, precoders applied to neighboring cells are coordinated based on information fed back to respective serving base stations from the user equipments so that the inter-cell interference is reduced. According to the PMI coordination, the user equipment searches for the most interfering PMI (hereinafter, referred to as worst PMI) or the least interfering PMI (hereinafter, referred to as best PMI) and feedbacks them to the serving base station. At this time, the serving base station sends a PMI coordination request to the neighboring base station to inform the neighboring base station of the worst PMI or the best PMI fed back by the user equipment so that the use of the worst PMI may be restricted or the use of the best PMI may be recommended. Accordingly, the neighboring base station does not use the worst PMI or use the best PMI. Therefore, the inter-cell interference may be reduced. However, the PMI coordination technology has several problems.

Firstly, ideal performance may be obtained under the ideal condition that signaling is performed between the user equipment at the cell boundary and the serving base station or between base stations using respective infinite bandwidth. However, in an embodiment which uses limited bandwidth, all of interfering subbands and PMIs cannot be eliminated, and thus residual interference exists. Accordingly, it is difficult to obtain the ideal performance. Therefore, more efficient signaling is needed.

Secondly, as the user equipment at the cell boundary sends the PMI coordination request to all neighboring interfering cells, the user equipment at another cell boundary sends the PMI coordination request. Like this, if each user equipment at the cell boundary sends many PMI coordination requests, the base station also receives many PMI coordination requests from the user equipments of other cells. Therefore, all base stations become short of band/PMI for serving their own user equipments. That is, a conflict exists between an aspect of the serving cell and that of the other cell.

Thirdly, on the contrary, in the case where the interfering cell accepts too few PMI coordination requests from the interfered cell, the interfering cell still uses a band/PMI which interferes with the neighboring cells, and thus a PMI coordination gain is small.

Therefore, there is a needed to efficiently reduce the inter-cell interference in order to reduce a conflict between cells.

SUMMARY OF THE INVENTION

An aspect of the present invention is to address at least the above-mentioned problems and/or disadvantages and to provide at least the advantages described below. Accordingly, an aspect of the present invention is to provide a device and a method for eliminating inter-cell interference in a Multiple Input Multiple Output (MIMO) wireless communication system.

Another aspect of the present invention is to provide a device and a method for selecting a Precoding Matrix Index (PMI) for minimizing inter-cell interference in a MIMO wireless communication system including a plurality of cells.

Another aspect of the present invention is to provide a device and a method for a user equipment to determine a predefined number of best bands among bands not requested to be restricted from a neighboring cell, and request restriction on PMI to an interfering neighboring cell for the determined predefined number of best bands in a MIMO wireless communication system including a plurality of cells.

Another aspect of the present invention is to provide a device and a method for correctly restricting PMI by configuring an update period of a band-PMI resource matrix to be equal to or smaller than that of a best band in a MIMO wireless communication system including a plurality of cells.

Another aspect of the present invention is to provide a device and a method for ignoring or accepting a request for restricting use of a band and PMI from a neighboring cell according to a result of determining whether a user equipment itself is a cell boundary user equipment in a MIMO wireless communication system including a plurality of cells.

Another aspect of the present invention is to provide a device and a method for a user equipment to determine whether the user equipment itself is a cell boundary user equipment by defining a position value of the user equipment and determining the position value of the user equipment itself in a MIMO wireless communication system including a plurality of cells.

Another aspect of the present invention is to provide a device and a method for differently operating values of n_restPMI (the number of restricted PMIs) and n_restBand (the number of restricted bands) among request set related parameters for user equipments classified into one of cell boundary user equipments and cell center user equipments in a MIMO wireless communication system including a plurality of cells.

In accordance with an aspect of the present invention, a method for operating a user equipment for eliminating the inter-cell interference in a MIMO wireless communication system is provided. The method includes determining one or more optimum bands among bands not requested to be restricted from a neighboring cell, determining at least one of band and PMI to be requested to be restricted to the neighboring cell among the determined one or more optimum bands, and feeding back at least one of the band and PMI to be requested to be restricted to the neighboring cell to a serving base station.

In accordance with another aspect of the present invention, a device for a user equipment to eliminate inter-cell interference in a MIMO wireless communication system is provided. The device includes an optimum band determining unit for determining one or more optimum bands among bands not requested to be restricted from a neighboring cell, a request set determining unit for determining at least one of band and PMI to be requested to be restricted to the neighboring cell among the determined one or more optimum bands, and a feedback transmitter for feeding back at least one of the band and PMI to be requested to be restricted to the neighboring cell to a serving base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In the following description, the technology for addressing Inter-Cell Interference (ICI) in a Multiple Input Multiple Output (MIMO) wireless communication system according to exemplary embodiments of the present invention will be explained. Hereinafter, exemplary embodiments of the present invention will be explained by way of an example of a wireless communication system employing Orthogonal Frequency Division Multiplexing (OFDM)/Orthogonal Frequency Division Multiple Access (OFDMA). However, the present invention may be applied to any other wireless communication system in the same way.

Also, hereinafter, exemplary embodiments of the present invention will be explained on the assumption that the use of Precoding Matrix Index (PMI), which significantly interferes with user equipment at a cell boundary, is restricted. However, the present invention is also applicable to the technique of recommending the use of PMI which minimally interferes with the user equipment at the cell boundary.

Figure 1:
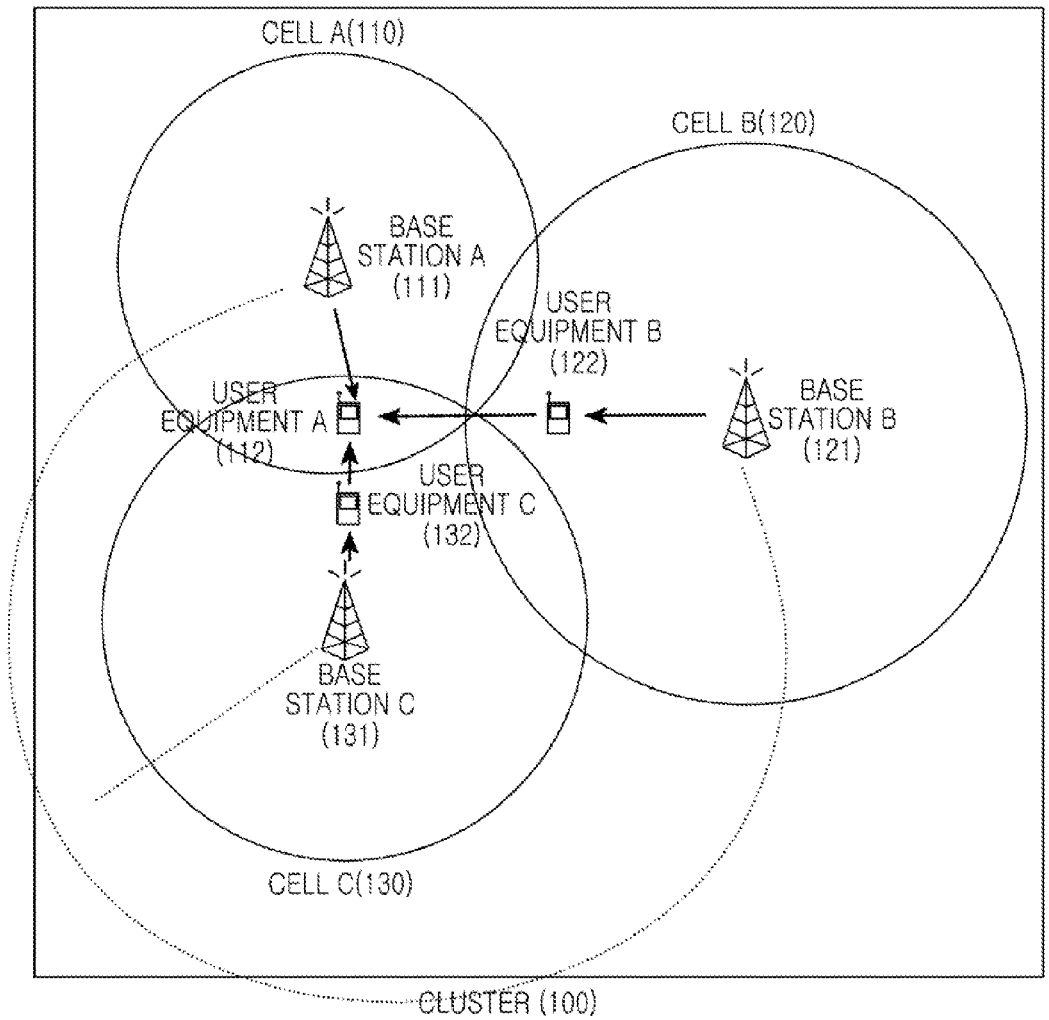
FIG. 1 is a diagram illustrating a situation where inter-cell interference occurs in an environment where a plurality of cells exists according to an exemplary embodiment of the present invention.

FIG. 1 is a diagram illustrating a situation where inter-cell interference occurs in an environment where a plurality of cells exists according to an exemplary embodiment of the present invention.

Referring to FIG. 1, it is assumed that the plurality of cells, e.g., a cell A 110, a cell B 120 and a cell C 130, constitutes one cluster 100. A base station A 111 providing service to cell A 110 performs a communication with a user equipment A 112. Likewise, a base station B 121 providing service to cell B 120 performs a communication with a user equipment B 122, and a base station C 131 providing service to cell C 130 performs a communication with a user equipment C 132. Within the one cluster 100, the base station A 111, the base station B 121 and the base station C 131 communicate with one another through a backbone network (not shown).

In the case where plural cells are adjacent to each other, as shown in FIG. 1, there occurs interference between neighboring cells. For instance, it is assumed that the base station A 111 transmits a signal to the user equipment A 112 positioned at a boundary of the cell A 110 on a first band, the base station B 121 transmits the signal to the user equipment B 122 positioned at the boundary of the cell B 120 on the first band, and the base station C 131 transmits the signal to the user equipment C 132 positioned at the boundary of the cell C 130 on the first band. Also, it is assumed that the user equipment A 112, the user equipment B 122 and the user equipment C 132 are positioned at the boundary where the cell A 110, the cell B 120 and the cell C 130 meet. In this case, when the user equipment A 112 receives the signal from the base station A 111, the signal is interfered by the signal transmitted from the base station B 121 to the user equipment B 122 and the signal transmitted from the base station C 131 to the user equipment C 132. In FIG. 1, an arrow is shown that points in a maximizing direction of a beam pattern by PMI. That is, the user equipment A 112 is significantly interfered due to the PMI used by the user equipment B 122 and the user equipment C 132.

Figure 2:
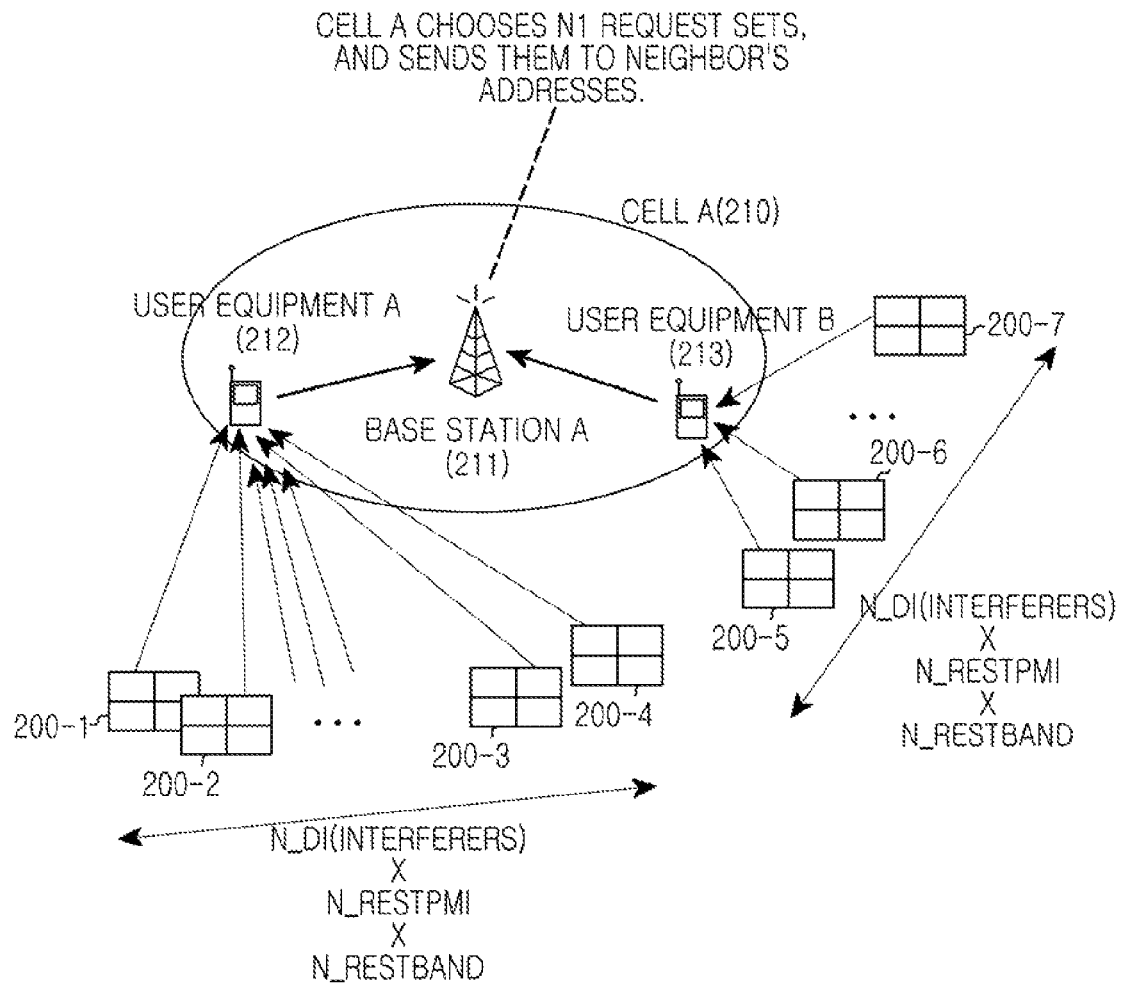
FIG. 2 is a diagram illustrating a method according to an exemplary embodiment of the present invention in a Multiple Input Multiple Output (MIMO) wireless communication system including a plurality of cells, wherein according to the method, user equipment at a cell boundary measures inference, determines a request set based on a result of the measurement, and reports the request set to a serving base station, and the serving base station transmits the reported request set to an interfering base station.

FIG. 2 is a diagram illustrating a method according to an exemplary embodiment of the present invention in a MIMO wireless communication system including a plurality of cells. According to the method, user equipment at a cell boundary measures inference, determines a request set based on a result of the measurement, and reports the request set to a serving base station. The serving base station transmits the reported request set to an interfering base station.

Herein, before explaining the method illustrated in FIG. 2, related parameters are explained as follows.

N_DI: denotes the number of dominant interfering base stations. That is, the number of dominant base stations which interfere with the user equipment at the cell boundary.

n_restPMI: denotes the number of PMIs restricted (i.e., not to be used).

n_restBand: denotes the number of bands restricted (i.e., not to be used).

Referring to FIG. 2, a user equipment A 212 and a user equipment 213 positioned at the boundary of a cell A 210 measure the interference received from other cells of dominant interfering base stations, determine the request set, e.g., 200-1 to 200-7, including interference information for each dominant interfering base station according to the measurement, and feedback the determined request set to the base station A 211. Herein, when the user equipment A 212 and the user equipment B 213 measure the interference of dominant interfering base stations, the interference is measured for all bands and all PMIs, and then, the most interfering case of n_restPMI×n_restBand is found. For optimum performance, the n_restPMI and the n_restBand should be determined as appropriate values.

Herein, the request set 200 for each dominant interfering base station includes the following information.

index(es) of restPMI—denotes index(es) of PMI restricted (i.e., not to be used).

index(es) of restBand—denotes index(es) of band restricted (i.e., not to be used).

additional information—denotes additional information, e.g., interference information measured from the index of restPMI and the index of restBand.

interfering cell index—denotes cell index causing interference.

The base station A 211 selects a predefined number (N1) of request sets from the request sets 200-1 to 200-7 for each dominant interfering base station received from the user equipment A 212 and the user equipment B 213, and transmits the selected request sets to the interfering base station corresponding to the selected request sets.

For reference, in the case of FIG. 2, although the most general case, i.e., n_restBand and index(es) of restBand, is explained as an example for convenience, n_restBand may be limited to the number of best bands and index(es) of restBand may be limited to indexes of best bands according to another exemplary embodiment of the present invention.

Also, for reference, in the case of FIG. 2, although it is described that the user equipment A determines one square request set for each dominant interfering base station, various forms/numbers of request sets are possible according to a result of searching for worst PMIs. For instance, it is possible that n_restBand=1, n_restPMI=1, and several numbers of such 1×1 sized request sets are determined (e.g., PMI 1@subband 1, PMI 2@subband 2, and PMI 5@subband 8).

Figure 3:
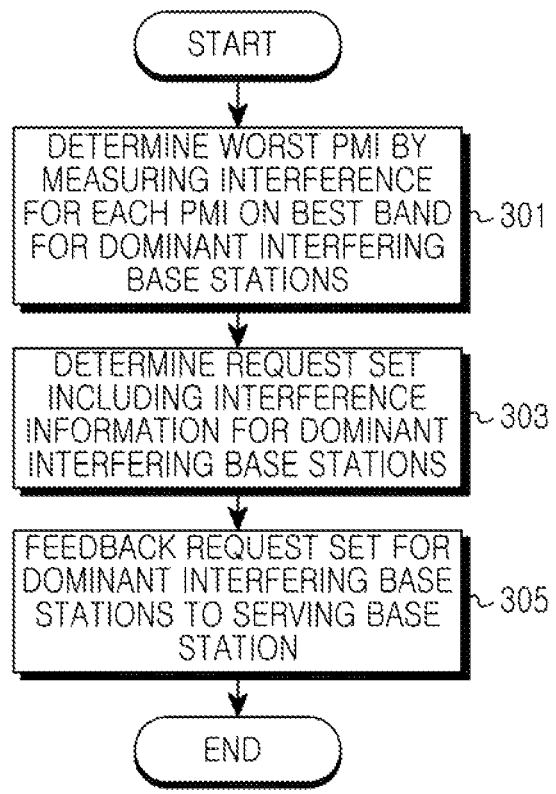
FIG. 3 is a flowchart illustrating a method for each user equipment at a cell boundary to measure interference, determine a request set based on a measurement result, and report the measurement result to a serving base station according to an exemplary embodiment of the present invention in a MIMO wireless communication system including a plurality of cells.

FIG. 3 is a flowchart illustrating a method for each user equipment at a cell boundary to measure interference, determine a request set based on a measurement result, and report the measurement result to a serving base station according to an exemplary embodiment of the present invention in a MIMO wireless communication system including a plurality of cells.

Referring to FIG. 3, the user equipment positioned at the cell boundary measures the interference for all PMIs on the best N-band for dominant interfering base stations of other cells in step 301. That is, the user equipment firstly determines the best N-bands within a serving cell among bands not requested to be restricted by a neighboring cell. Then, the user equipment determines the worst PMI as much as n_restPMI on the determined best N-bands for each dominant interfering base station.

In another exemplary embodiment, the user equipment may measure the interference of the dominant interfering base stations for n_restBand sized superset including the best N-band determined as above within the serving cell and just for predefined numbers of PMI. That is, even if the user equipment reports the best N-band to the serving base station at a predefined time t0, since the best N-band itself may be changed after a lapse of Δt according to channel environment, the superset is configured considering a new best N-band at the time t0+Δt.

In still another exemplary embodiment, the user equipment may find the worst case of n_restBand×n_restPMI after determining the interference for all bands and all PMIs regardless of the best N-band determined as described above within the serving cell.

Also, the exemplary embodiment of the present invention considers the technique of restricting the use of PMI which largely interferes with the user equipment at the cell boundary. However, in the case of considering the technique of recommending the use of PMI which little interferes with the user equipment at the cell boundary, the interference measurement for the dominant interfering base stations may be performed to the rest of the bands except for the best N-band determined as described above within the serving cell, and the user equipment may recommend the use of a lesser interfering PMI accordingly.

Thereafter, the user equipment determines the request set including the interference information for each dominant interfering base station according to the measurement in step 303. In step 305, the user equipment feedbacks the determined request set for each dominant interfering base station to the serving base station.

Thereafter, the user equipment finishes the algorithm according to an exemplary embodiment of the present invention.

Figure 4:
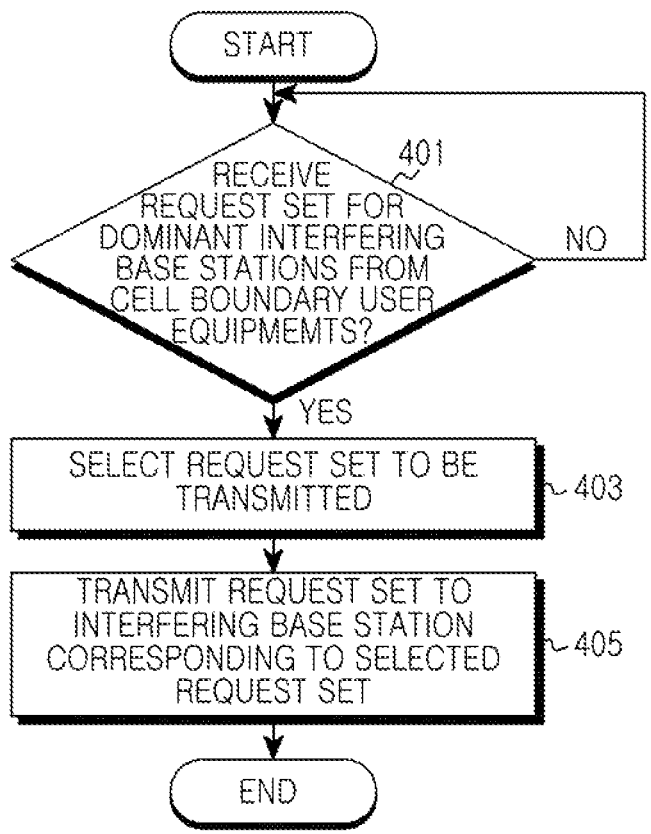
FIG. 4 is a flowchart illustrating a method for a serving base station to transmit a request set reported by a user equipment at a cell boundary to an interfering base station according to an exemplary embodiment of the present invention in a MIMO wireless communication system including a plurality of cells.

FIG. 4 is a flowchart illustrating a method for a serving base station to transmit a request set reported by a user equipment at a cell boundary to an interfering base station according to an exemplary embodiment of the present invention in a MIMO wireless communication system including a plurality of cells.

Referring to FIG. 4, the serving base station detects whether the request set for each dominant interfering base station is received from the user equipments at the cell boundary in step 401.

If it is detected that the request set for each dominant interfering base station is received from the user equipments at the cell boundary in step 401, the serving base station selects predefined numbers (N1) of the most interfering request sets from the request set for each dominant interfering base station received from the user equipments at the cell boundary in step 403.

Thereafter, the serving base station transmits the selected request sets to the interfering base stations corresponding to the selected request sets through the backbone network to request restriction on the use of corresponding band and PMI in step 405.

Thereafter, the serving station finishes the algorithm according to an exemplary embodiment of the present invention.

Figure 5:
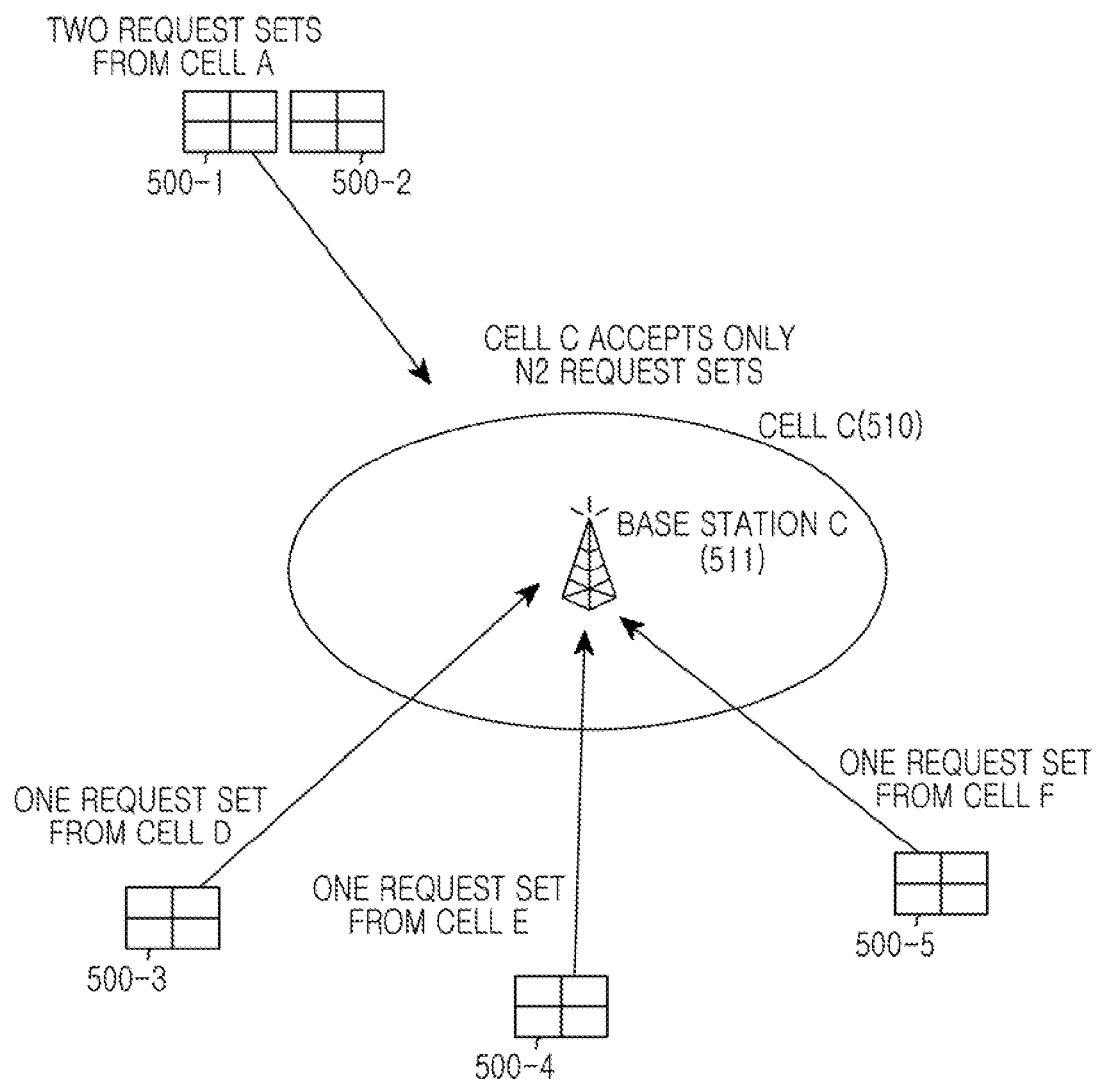
FIG. 5 is a diagram illustrating a method for an interfering base station to receive a request set from a serving base station according to an exemplary embodiment of the present invention in a MIMO wireless communication system including a plurality of cells.

FIG. 5 is a diagram illustrating a method for an interfering base station to receive a request set from a serving base station according to an exemplary embodiment of the present invention in a MIMO wireless communication system including a plurality of cells.

Referring to FIG. 5, it is assumed that a cell C 510 interferes with a cell A, a cell D, a cell E, and a cell F while it transmits a signal to user equipment within its service region. Accordingly, a base station C 511 which provides service to cell C 510 may receive two request sets 500-1 and 500-2 from the cell A, and respective one request set 500-3, 500-4 and 500-5 from the cells D, E and F through the backbone network.

Figure 6:
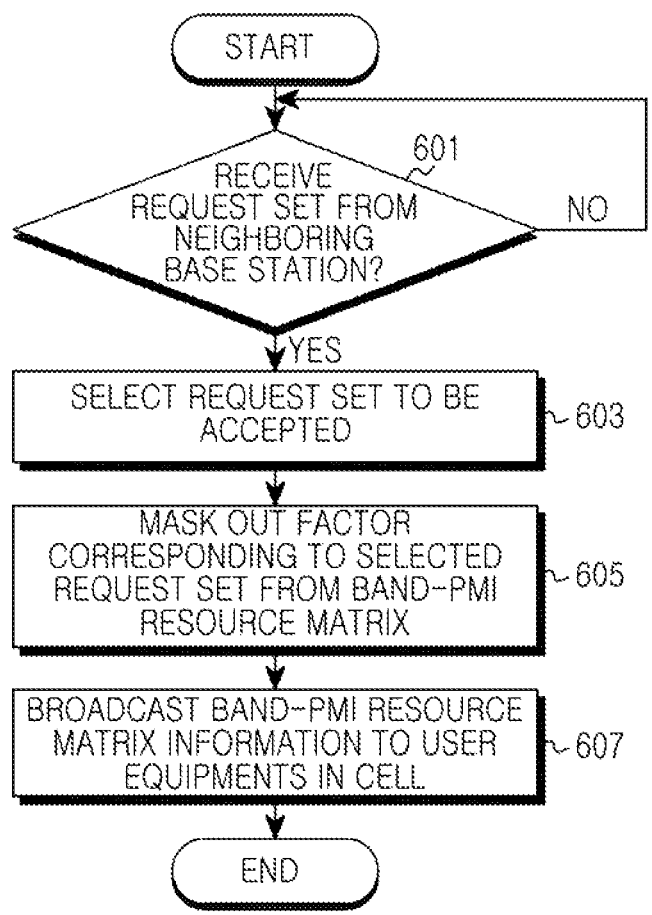
FIG. 6 is a flowchart illustrating a method for an interfering base station to receive a request set from a serving base station and update a band-Precoding Matrix Index (PMI) resource matrix based on the received request set according to an exemplary embodiment of the present invention in a MIMO wireless communication system including a plurality of cells.

FIG. 6 is a flowchart illustrating a method for an interfering base station to receive a request set from a serving base station and update a band-PMI resource matrix based on the received request set according to an exemplary embodiment of the present invention in a MIMO wireless communication system including a plurality of cells.

Referring to FIG. 6, the interfering base station detects whether a request set for requesting restriction on the use of band and PMI is received from a neighboring base station in step 601.

If it is detected that the request set is received from the neighboring base station in step 601, the interfering base station selects predefined numbers (N2) of request sets to be accepted from the received request set in step 603.

Thereafter, in step 605, the interfering base station masks out a factor corresponding to the selected request set at the band-PMI resource matrix to update the band-PMI resource matrix. For instance, the interfering base station may configure the band-PMI resource matrix as illustrated in FIG. 7 by combining the request set received from the neighboring base stations in a method of union.

Figure 7:
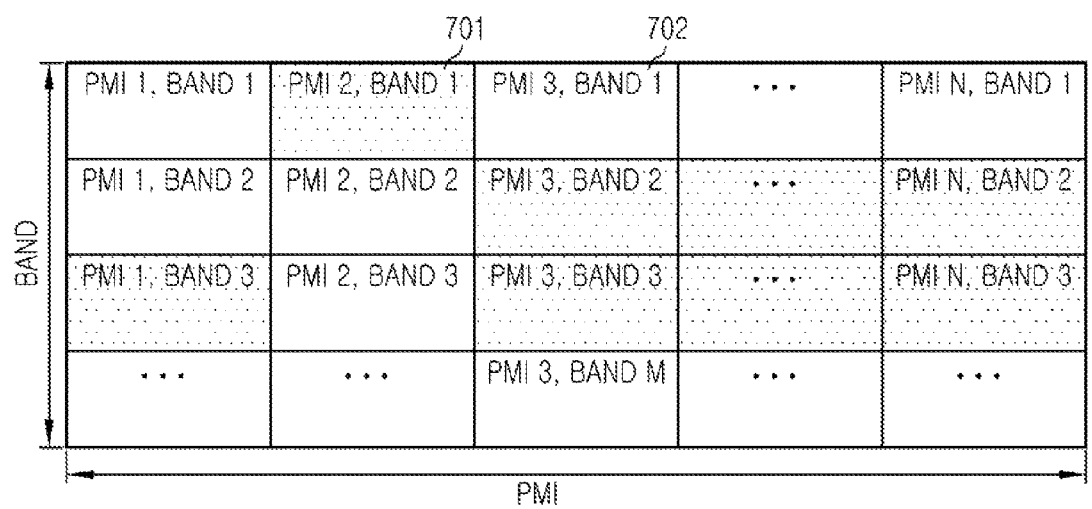
FIG. 7 is a diagram illustrating a method for configuring a band-PMI resource matrix according to an exemplary embodiment of the present invention in a MIMO wireless communication system including a plurality of cells.

FIG. 7 is a diagram illustrating a method for configuring a band-PMI resource matrix according to an exemplary embodiment of the present invention in a MIMO wireless communication system including a plurality of cells.

Referring to FIG. 7, a factor 701 marked by a pattern among factors of the band-PMI resource matrix is masked out according to reception of a request set for restriction on the use of corresponding band and PMI from the user equipments at the cell boundary of neighboring cells. Also, a factor 702 not marked by a pattern among the factors of the band-PMI resource matrix is not masked out because the interfering base station does not receive the request set for restriction on the use of corresponding band and PMI from the user equipments at the cell boundary of neighboring cells.

Returning to FIG. 6, the interfering base station thereafter broadcasts information about the updated band-PMI resource matrix to user equipments within the cell in step 607.

Thereafter, the interfering station finishes the algorithm according to the exemplary embodiment of the present invention.

Figure 8:
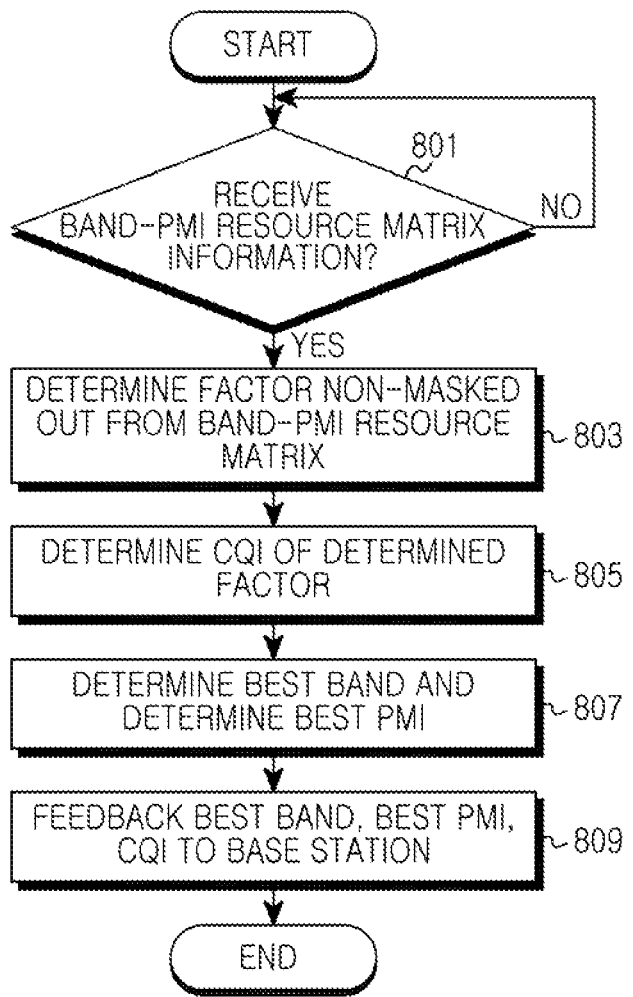
FIG. 8 is a flowchart illustrating a method for a user equipment in a cell of an interfering base station to receive an updated band-PMI resource matrix, determine a best band based on the received band-PMI resource matrix, and determine PMI of the determined best band to report it according to an exemplary embodiment of the present invention in a MIMO wireless communication system including a plurality of cells.

FIG. 8 is a flowchart illustrating a method for a user equipment in a cell of an interfering base station to receive an updated band-PMI resource matrix, determine a best band based on the received band-PMI resource matrix, and determine PMI of the determined best band to report it according to an exemplary embodiment of the present invention in a MIMO wireless communication system including a plurality of cells.

Referring to FIG. 8, the user equipment in the cell of the interfering base station detects whether the updated band-PMI resource matrix information is received from the interfering base station in step 801.

If it is detected that the updated band-PMI resource matrix information is received in step 801, the user equipment determines non-masked out factors from the updated band-PMI resource matrix, i.e., determines the factors not requested to be restricted from the neighboring cell, in step 803. In step 805, Channel Quality Indicators (CQIs) of the determined factors are determined.

Thereafter, in step 807, the user equipment determines predefined numbers (N) of best bands based on the determined CQIs and determines best PMI for each best band.

Thereafter, in step 809, the user equipment feedbacks the determined best N-bands, the determined best PMI for each determined best N-band, and corresponding CQI to its serving base station, i.e., the interfering base station.

Thereafter, the user equipment finishes the algorithm according to the exemplary embodiment of the present invention.

Figure 9A:
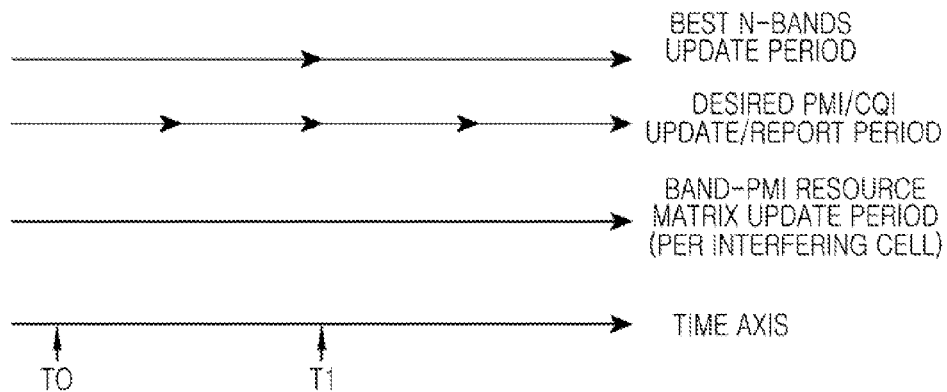
FIGS. 9A-9C are diagrams illustrating an update period of a band-PMI resource matrix according to an exemplary embodiment of the present invention in a MIMO wireless communication system including a plurality of cells.
Figure 9B:
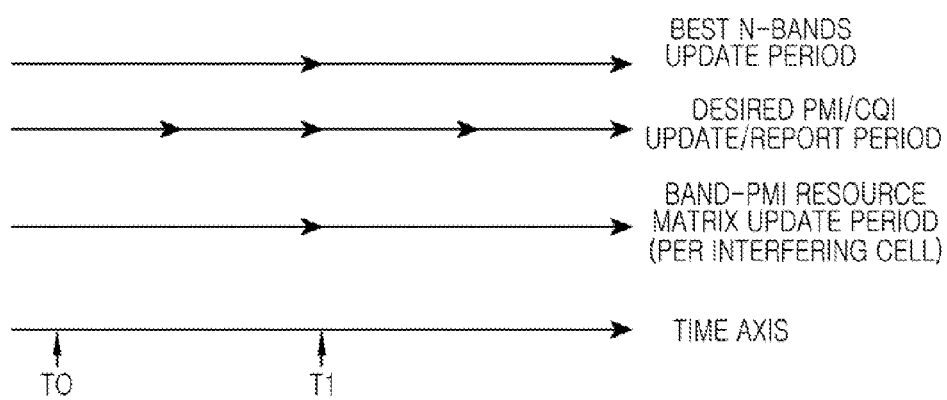
Figure 9C:
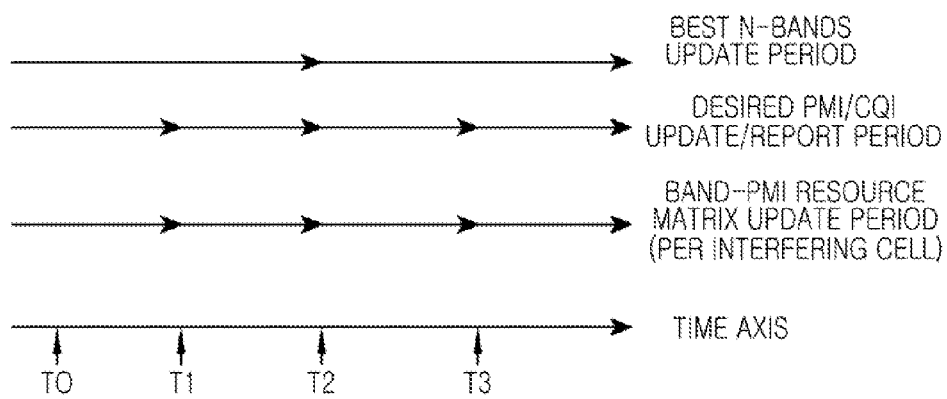

FIGS. 9A-9C are diagrams illustrating an update period of a band-PMI resource matrix according to an exemplary embodiment of the present invention in a MIMO wireless communication system including a plurality of cells.

Referring to FIG. 9A, the update period of the band-PMI resource matrix may be configured to be larger than that of the best N-band. For instance, the best N-band is updated at a time point t0, and the request set for each dominant interfering base station is determined only for the updated best N-band at the time point t0, and the band-PMI resource matrix is updated based on the determined request set at the time point t0. The best N-band is updated again at a time point t1. However, the band-PMI resource matrix is not updated. Accordingly, the band-PMI resource matrix updated at the time point t0 may be incorrect at the time point t1.

Referring to FIG. 9B, the update period of the band-PMI resource matrix may be configured to be equal to that of the best N-band. For instance, the best N-band is updated at the time point t0, and the request set for each dominant interfering base station is determined only for the updated best N-band at the time point t0, and the band-PMI resource matrix is updated based on the determined request set at the time point t0. In the same manner, the best N-band and the band-PMI resource matrix are updated also at the time point t1. Accordingly, the problem of incorrectness at the time point t1 is solved.

Referring to FIG. 9C, the update period of the band-PMI resource matrix may be configured to be smaller than that of the best N-band. That is, the user equipment updates the best N-band setting the update period of the band-PMI resource matrix to be smaller than that of the best N-band. At the same time, the update period of the band-PMI resource matrix may be configured to the period of desired PMI/CQI update/report. That is, whenever the desired PMI/CQI is updated/reported, the band-PMI resource matrix is updated so that changed desired PMI/CQI may be instantly considered. For instance, the desired PMI/CQI is updated/reported at the time points t0, t1, t2 and t3, the best N-band is updated at the time points t0 and t2, the request set for each dominant interfering base station is determined just for the updated best N-band at the time points t0 and t2, and the band-PMI resource matrix is updated based on the determined request set at the time points t0, t1, t2 and t3. In the case of the method illustrated in FIG. 9C, feedback is needed more often in comparison with the method illustrated in FIG. 9B. However, since the determination of desired PMI is changed at the neighboring cell in the middle of every update of the band-PMI resource matrix, the performance may be more improved than the method illustrated in FIG. 9B.

Meanwhile, according to the exemplary embodiment of the present invention, when the base station configures the band-PMI resource matrix, if a particular factor may interfere with the user equipment at the boundary of another cell, the corresponding factor is masked out for the user equipment at the cell boundary not to use the factor requested to be restricted. However, the factor requested to be restricted may be needed for the user equipment at the cell boundary. An example of which is described below with reference to FIG. 10.

Figure 10:
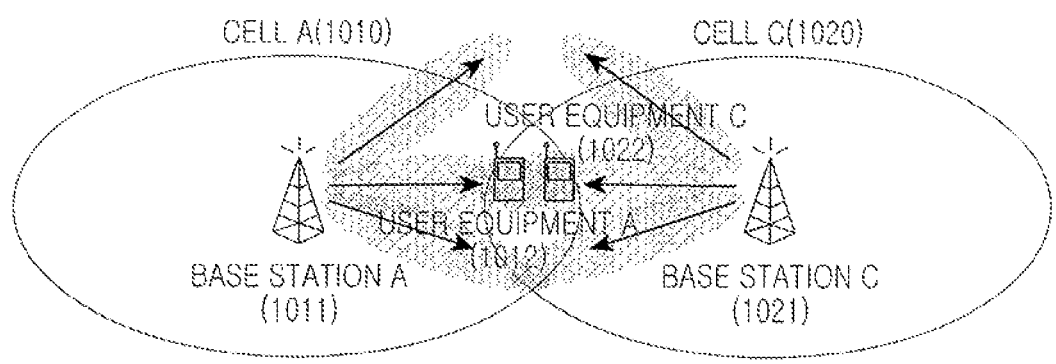
FIG. 10 is a diagram illustrating a situation where cell boundary user equipments need the same request set according to an exemplary embodiment of the present invention in a MIMO wireless communication system including a plurality of cells.

FIG. 10 is a diagram illustrating a situation where cell boundary user equipments need the same request set according to an exemplary embodiment of the present invention in a MIMO wireless communication system including a plurality of cells.

Referring to FIG. 10, between a user equipment A 1012 positioned at a boundary of a cell A 1010 that is provided service by base station A 1011 and a user equipment C 1022 positioned at a boundary of a cell C 1020 that is provided service by base station C 1021, there may occur a conflict situation where, while the user equipment A 1012 restricts a particular band and a particular PMI to the cell C 1020, the user equipment C 1022 requests the particular band and particular PMI as a best PMI at a best band. Accordingly, as another exemplary embodiment, for the factor masked out at the band-PMI resource matrix, each user equipment may determine whether each user equipment itself is positioned at the cell boundary. If it is determined as the cell boundary-positioned user equipment, the request for restricting the masked-out factor may be ignored. If it is determined as not the cell boundary-positioned user equipment, the request for restricting the masked-out factor may be accepted. In this case, since only the user equipments positioned at a center of the cell accept the request for restricting the masked-out factor, the gain of the user equipments at the cell boundary is secured due to the yielding of the user equipments at the cell center. Herein, the user equipments at the cell boundary may be configured to request for restricting the use of particular band and PMI to other cells. However, the user equipments at the cell center may be configured not to request for restricting the use of particular band and PMI to other cells.

To this end, according to an exemplary embodiment of the present invention, a position value of the user equipment is defined according to Equation (1). The user equipment may determine whether the user equipment itself is positioned at the cell boundary by determining the position value of the user equipment.

$$\text{geometry} = \frac{I_{or}}{I_{oc} + \text{noise}} \quad \text{Equation (1)}$$

where $I_{or}$ denotes an antenna gain separated by path loss from the serving cell and shadowing and corresponds to a long term channel power received from the serving cell. $I_{oc}$ denotes a sum of the antenna gain separated by path loss from the other cells and shadowing and corresponds to the long term channel power received from the other cells.

Figure 11A:
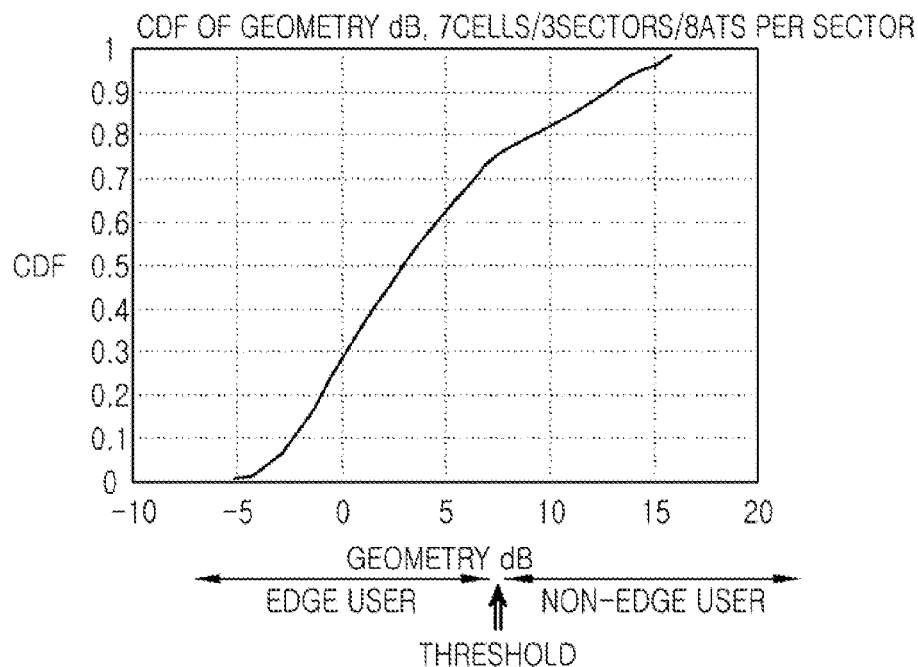
FIGS. 11A and 11B are diagrams illustrating a method for classifying user equipments using a Cumulative Distribution Function (CDF) of a position value according to an exemplary embodiment of the present invention in a MIMO wireless communication system including a plurality of cells.
Figure 11B:
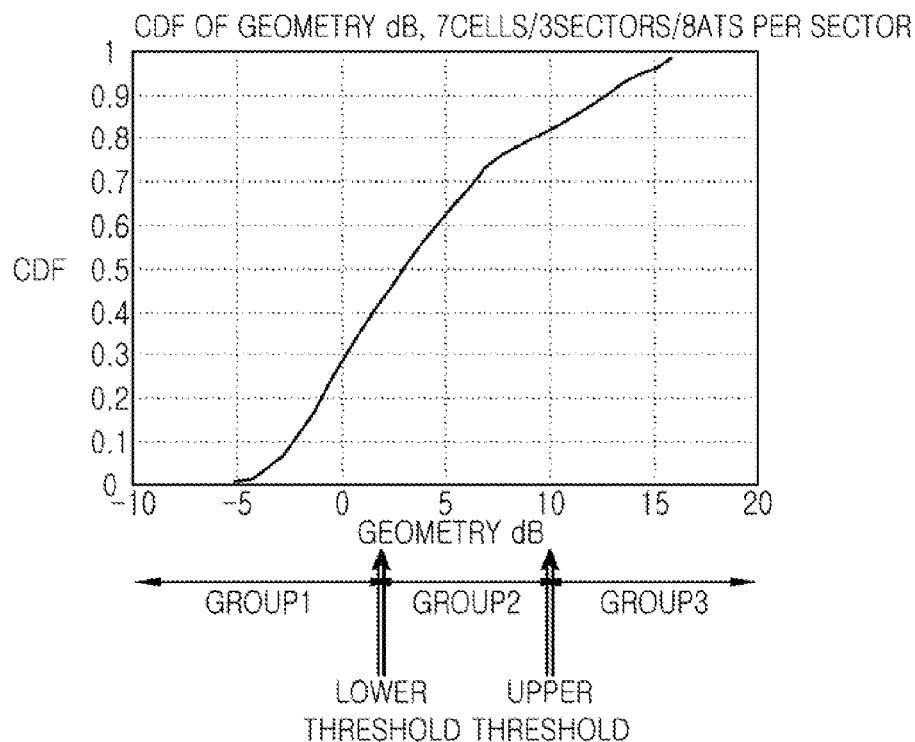

FIGS. 11A and 11B are diagrams illustrating a method for classifying user equipments using a Cumulative Distribution Function (CDF) of a position value according to an exemplary embodiment of the present invention in a MIMO wireless communication system including a plurality of cells.

Herein, for distinguishing the user equipment at the cell boundary using the position value, as illustrated in FIG. 11A, one position value may be determined as a reference value (threshold) on CDF of the position value. In this case, the user equipment having a smaller position value than the reference value may be classified into the user equipment at the cell boundary, and the user equipment having an equal or larger position value than the reference value may be classified as the user equipment at the cell center.

Herein, if the reference value is determined as too high, since the user equipment at the cell boundary is widely defined, many user equipments send the request set so that there occurs conflicts between the user equipments at the cell boundary. Accordingly, as illustrated in FIG. 11B, two position values may be determined as a first reference value (e.g., lower threshold) and a second reference value (e.g., upper threshold) on the CDF of position value. In this case, the user equipments are grouped into three groups. Firstly, the user equipments having a smaller position value than the first reference value are grouped into a first group, and they are classified as most adjacent to the cell boundary. In the case of the user equipments in the first group, they request the restriction on the use of particular band and PMI to the other cell, but they ignore the request for restricting the use of particular band and PMI from the other cell (e.g., the user equipment in the first group of the other cell, or the user equipment in a second group of the other cell). They obtain gains due to the yielding of the user equipments whose position values are larger than the first reference value. In this case, the conflicts between the user equipments in the first group still may not be avoided. However, since the first value itself is low, a probability of the conflicts is low. Next, the user equipments whose position values are equal to or larger than the first reference value and smaller than the second reference value are grouped into the second group. They are classified as more adjacent to the cell center than the user equipments in the first group. In the case of the user equipments in the second group, they request the restriction on the use of particular band and PMI to the other cell, and they also accept the request for restricting the use of particular band and PMI from the other cell (e.g., the user equipment in the first group of the other cell, or the user equipment in the second group of the other cell). They obtain gains due to the yielding of the user equipments (third group) whose position values are larger than the second reference value. In this case, the user equipments in the second group accept the request for restricting the use of particular band and PMI from each other. Therefore, there still occur conflicts between the user equipments in the second group, and they yield to the mobile groups in the first group. Lastly, the user equipments whose position values are equal to or larger than the second reference value are grouped into the third group. They are classified as being positioned at the cell center. In the case of the user equipments in the third group, they do not request the restriction on the use of particular band and PMI to the other cell, and they accept the request for restricting the use of particular band and PMI from the other cell (e.g., the user equipment in the first group of the other cell, or the user equipment in the second group of the other cell). Due to the yielding of the user equipments in the third group, the first and second groups obtain gains. There still occur conflicts between the user equipments in the third group.

Meanwhile, for configuring the band-PMI resource matrix according to the present invention, only an appropriate ratio of factors should be masked out for the optimum performance. To this end, the n_restPMI and n_restBand should be determined as appropriate values. Therefore, it is proposed to differently operate the values of n_restPMI and n_restBand for the user equipments grouped by using the position value of the user equipment. For instance, in the case of FIG. 11B, it may be configured for the user equipments in the first group to use the largest values of n_restPMI and n_restBand, it may be configured for the user equipments in the second group to use smaller values of n_restPMI and n_restBand than those used by the user equipments in the first group, and it may be configured for the user equipments in the third group to use smaller value of n_restPMI and n_restBand than those used by the user equipments in the first and second groups.

Figure 12:
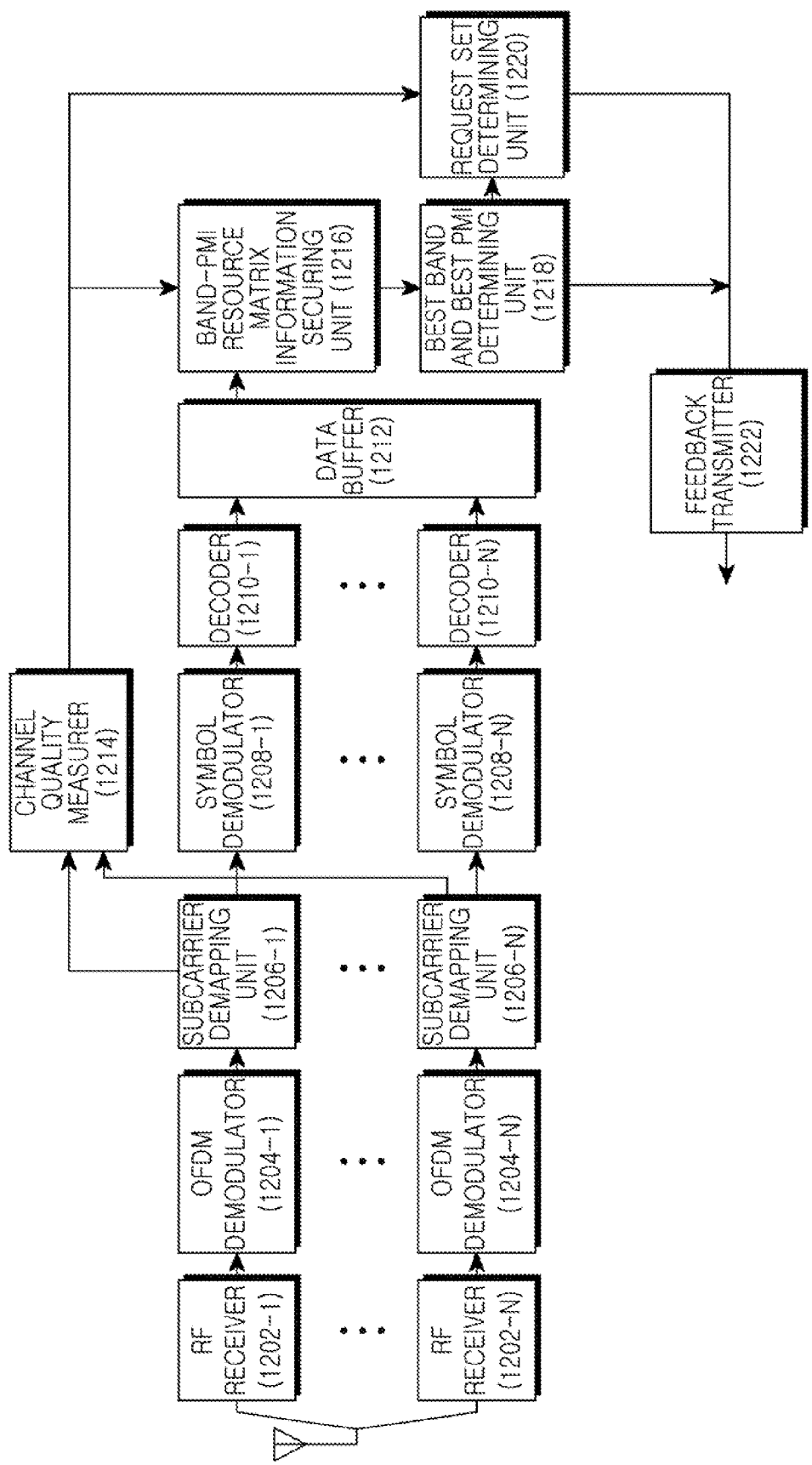
FIG. 12 is a block diagram illustrating a user equipment according to an exemplary embodiment of the present invention in a MIMO wireless communication system including a plurality of cells.

FIG. 12 is a block diagram illustrating a user equipment according to an exemplary embodiment of the present invention in a MIMO wireless communication system including a plurality of cells.

As shown, the user equipment includes a plurality of Radio Frequency (RF) receivers 1202-1 to 1202-N, a plurality of OFDM demodulators 1204-1 to 1204-N, a plurality of subcarrier demapping units 1206-1 to 1206-N, a plurality of symbol demodulators 1208-1 to 1208-N, a plurality of decoders 1210-1 to 1210-N, a data buffer 1212, a channel quality measurer 1214, a band-PMI resource matrix information securing unit 1216, a best band and best PMI determining unit 1218, a request set determining unit 1220, and a feedback transmitter 1222.

Referring to FIG. 12, each of the RF receivers 1201-1 to 1202-N converts an RF band signal received through the antenna into a baseband signal. Each of the OFDM demodulators 1204-1 to 1204-N divides the baseband signal in a unit of OFDM symbol, eliminates Cyclic Prefix (CP), and then restores complex symbols mapped to a frequency region through Fast Fourier Transform (FFT) operation. Each of the subcarrier demapping units 1206-1 to 1206-N extracts actual data complex symbols from the complex symbols to provide them to each of the symbol demodulators 1208-1 to 1208-N, and extracts symbols (e.g., pilot symbol) at a predefined position for channel estimation to provide them to the channel quality measurer 1214. Each of the symbol demodulators 1208-1 to 1208-N demodulates the complex symbols to convert them to encoded bit series. Each of the decoders 1210-1 to 1210-N decodes the encoded bit series. The data buffer 1212 temporarily stores the information bit series decoded by the decoders 1210-1 to 1210-N.

The channel quality measurer 1214 measures quality of the channel to the serving base station by using the signal provided by the subcarrier demapping units 1206-1 to 1206-N, and determines CQI based on the measurement. In other words, the channel quality measurer 1214 measures a ratio between power of the signal received from the serving base station through a sub channel allocated by the serving base station and powers of other signals. Herein, the channel quality is one of Signal to Noise Ratio (SNR), Carrier to Interference-plus-Noise Ratio (CINR), and Signal to Interference-plus-Noise Ratio (SINR). Also, the channel quality measurer 1214 measures interfering power from the neighboring base stations.

The band-PMI resource matrix securing unit 1216 secures the band-PMI resource matrix information provided from the serving base station through the data buffer 1212, and determines non-masked out factor at the secured band-PMI resource matrix. Also, the band-PMI resource matrix securing unit 1216 extracts CQI corresponding to the non-masked out factor from the CQI determined by the channel quality measurer 1214.

The best band and best PMI determining unit 1218 determines N numbers of best bands having the largest CQI among the non-masked out factors from the secured band-PMI resource matrix, determines best PMI for each determined best band, and generates feedback information with corresponding CQI. Herein, the best band and best PMI determining unit 1218 updates the best band configuring the update period of the band-PMI resource matrix to be smaller than or equal to that of the best band.

The request set determining unit 1220 extracts interfering power for all possible neighboring cell PMI on best N bands determined at the best band and best PMI determining unit 1218 for the dominant interfering base stations from the interfering power from the neighboring base stations provided by the channel quality measurer 1214. Based on this, the request set determining unit 1220 determines the request set including the interfering power information extracted for each dominant interfering base station and generates the feedback information.

The feedback transmitter 1222 transmits the feedback information generated by the best band and best PMI determining unit 1218 and the request set determining unit 1220 to the serving base station. That is, the feedback transmitter 1222 converts the feedback information into a signal by encoding and modulating the feedback information, configures the OFDM symbol through IFFT operation and CP insertion, and transmits it through the antenna.

Although not illustrated, the user equipment further includes a request set receiving unit. The request set receiving unit determines whether the user equipment itself is positioned at the cell boundary. If it is determined that the user equipment is positioned at the cell boundary, it may ignore the request for restricting the use of band and PMI from the neighboring cell. If it is determined that the user equipment is not positioned at the cell boundary, it may accept the request for restricting the use of band and PMI from the neighboring cell. Herein, whether the user equipment itself is positioned at the cell boundary may be determined by using Equation (1). As another exemplary embodiment, the request set receiving unit may determine the group where the user equipment itself is included according to its position. If it is determined that the user equipment belongs to the first group, the request for restricting the use of band and PMI from the user equipments of the first or second group of the neighboring cell may be ignored. Also, if it is determined that the user equipment belongs to the second group, the request set receiving unit may accept the request for restricting the use of band and PMI from the user equipments of the first or second group of the neighboring cell. Also, if it is determined that the user equipment belongs to the third group, the request set receiving unit may accept the request for restricting the use of band and PMI from the user equipments of the first or second group of the neighboring cell. In this case, the user equipment of the first or second group may request the restriction on the use of particular band and PMI to the neighboring cell, and the user equipment of the third group does not request the restriction on the use of particular band and PMI to the neighboring cell.

Figure 13:
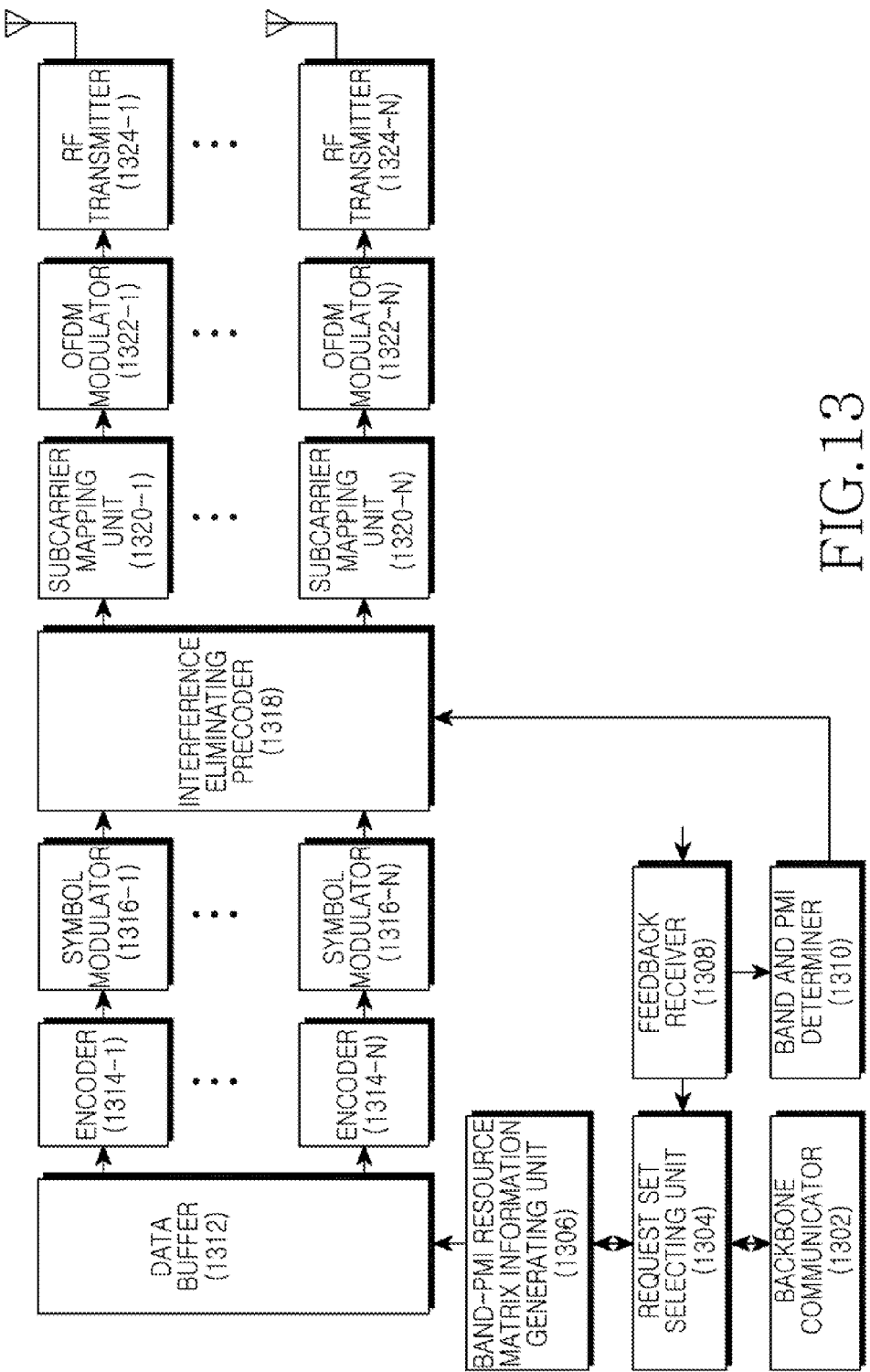
FIG. 13 is a block diagram illustrating a base station according to an exemplary embodiment of the present invention in a MIMO wireless communication system including a plurality of cells.

FIG. 13 is a block diagram illustrating a base station according to an exemplary embodiment of the present invention in a MIMO wireless communication system including a plurality of cells.

As shown, the base station includes a backbone communicator 1302, a request set selecting unit 1304, a band-PMI resource matrix information generating unit 1306, a feedback receiver 1308, a band and PMI determiner 1310, a data buffer 1312, a plurality of encoders 1314-1 to 1314-N, a plurality of symbol modulators 1316-1 to 1316-N, a interference eliminating precoder 1318, a plurality of subcarrier mapping units 1320-1 to 1320-N, a plurality of OFDM modulators 1322-1 to 1322-N, a plurality of RF transmitters 1324-1 to 1324-N.

Referring to FIG. 13, the backbone communicator 1302 provides interface for performing communication with the neighboring base stations through the backbone network. More particularly, the backbone communicator 1302 transmits the request set provided by the request set selecting unit 1304 to the neighboring base station corresponding to the request set, and provides the request set received from the neighboring base stations to the request set selecting unit 1304.

The request set selecting unit 1304 selects predefined numbers (N1) of the most interfering request sets from the request sets for each dominant interfering base station received from the user equipments at the cell boundary through the feedback receiver 1308, and provides the selected request sets to the backbone communicator 1302. Also, the request set selecting unit 1304 selects predefined numbers (N2) of request sets to be accepted from the request sets received from the neighboring base stations through the backbone communicator 1302, and provides the selected predefined numbers (N2) of request sets to the band-PMI resource matrix information generating unit 1306.

The band-PMI resource matrix information generating unit 1306 configures and updates the band-PMI resource matrix by masking out factors corresponding to the predefined numbers (N2) of request sets provided by the request set selecting unit 1304 from the band-PMI resource matrix, and provides the information about the configured and updated band-PMI resource matrix to the data buffer 1312 so that it is broadcasted to the user equipments in the cell.

The feedback receiver 1308 receives the feedback information from the user equipment. Among the received feedback information, the request set for each dominant interfering base station is provided to the request set selecting unit 1304, and the best band and best PMI and the corresponding CQI are provided to the band and PMI determiner 1310.

The band and PMI determiner 1310 determines band and PMI to be used for transmitting a signal to the corresponding user equipment by using the best band and best PMI and the corresponding CQI provided by the feedback receiver 1308. The determined band and PMI are provided to the interference eliminating precoder 1318.

The data buffer 1312 temporarily stores data to be transmitted to the user equipment and outputs the stored data when transmission time comes. Each of the encoders 1314-1 to 1314-N encodes the data bit series provided by the data buffer 1312. Each of the symbol modulators 1316-1 to 1316-N converts the encoded bit series into the complex symbols by modulating the encoded bit series. The interference eliminating precoder 1318 performs precoding for eliminating inter-cell interference. That is, the interference eliminating precoder 1318 precodes transmission signals by using a precoding matrix corresponding to the band and PMI selected by the band and PMI determiner 1310. Each of the subcarrier mapping units 1320-1 to 1320-N maps transmission signals of transmission path corresponding to the subcarrier mapping unit itself among the precoded transmission signals to the subcarrier so that signals of the frequency region are configured. Each of the OFDM modulators 1322-1 to 1322-N converts the signals of the frequency region into the signals of time region trough Inverse Fast Fourier Transform (IFFT) operation, and then configures the OFDM symbols of the baseband by inserting CP. Each of the RF transmitters 1324-1 to 1324-N converts the OFDM symbols of the baseband into the signals of the RF band, and then transmits it through the antenna.

As above-described, according to exemplary embodiments of the present invention, in a MIMO wireless communication system including a plurality of cells, user equipment determines predefined numbers of best bands among the bands not requested to be restricted by the neighboring cell, finds the worst PMI on the determined predefined numbers of best bands, and then requests the PMI restriction to the interfering neighboring cell. Therefore, in comparison with the conventional method of finding the worst PMI for all bands and all PMIs, the inter-cell interference may be efficiently reduced with reducing the conflicts between the cells. Further, the throughput of the user equipment at the cell boundary may be improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a user equipment for eliminating inter-cell interference in a multiple input multiple output (MIMO) wireless communication system, the method comprising:
   identifying, by the user equipment, bands not requested to be restricted from a neighboring cell;
   determining, by the user equipment, one or more optimum bands among the identified bands according to a first period for updating the one or more optimum bands;
   determining, by the user equipment, band and precoding matrix index (PMI) to be requested to be restricted to the neighboring cell among the determined one or more optimum bands according to a second period for updating the band and the PMI; and
   transmitting, by the user equipment, feedback information comprising the band and PMI to be requested to be restricted to the neighboring cell to a serving base station,
   wherein a length of the second period for updating the band and the PMI is smaller than a length of the first period for updating the one or more optimum bands.

2. The method of claim 1, further comprising updating the determined one or more optimum bands by configuring an update period of a band-PMI resource matrix as smaller than that of the optimum bands.

3. The method of claim 1, further comprising receiving a band-PMI resource matrix from the serving base station,
   wherein the identifying of the bands identifies the bands not requested to be restricted from the neighboring cell based on the received band-PMI resource matrix.

4. The method of claim 3, further comprising:
   determining whether the user equipment itself is a cell boundary user equipment;

ignoring the request for restricting use of band and PMI from the neighboring cell when it is determined that the user equipment is the cell boundary user equipment; and accepting the request for restricting the use of band and PMI from the neighboring cell when it is determined that the user equipment is not the cell boundary user equipment.

5. The method of claim 4, wherein whether the user equipment itself is the cell boundary user equipment is determined by determining a position value using the equation:

$$\text{geometry} = \frac{I_{or}}{I_{oc} + \text{noise}}$$

where $I_{or}$ denotes an antenna gain separated by path loss from a serving cell and shadowing and corresponds to a long term channel power received from the serving cell, and $I_{oc}$ denotes a sum of the antenna gain separated by path loss from other cells and shadowing, and corresponds to the long term channel power received from the other cells.

6. The method of claim 5, wherein the determining of whether the user equipment itself is the cell boundary user equipment comprises:

determining that the user equipment is the cell boundary user equipment when the determined position value is smaller than a reference value; and determining that the user equipment is not the cell boundary user equipment when the determined position value is larger than or equal to the reference value.

7. The method of claim 4, wherein the number of the one or more optimum bands is configured as larger for the cell boundary user equipment than for a non-cell-boundary user equipment.

8. The method of claim 4, wherein the non-cell-boundary user equipment does not transmit the feedback information.

9. The method of claim 3, further comprising:

determining a group where the user equipment itself is included according to a position of the user equipment itself;

ignoring the request for restricting use of band and PMI from a first group user equipment or a second group user equipment of the neighboring cell when the user equipment itself is determined as the first group user equipment which transmits the feedback information;

accepting the request for restricting the use of band and PMI from the first group user equipment or the second group user equipment of the neighboring cell when the user equipment itself is determined as the second group user equipment which transmits the feedback information; and accepting the request for restricting the use of band and PMI from the first group user equipment or the second group user equipment of the neighboring cell when the user equipment itself is determined as a third group user equipment which does not transmit the feedback information.

10. The method of claim 1, wherein the determining of the at least one of band and PMI to be requested to be restricted to the neighboring cell comprises:

measuring interference for all neighboring cell PMIs on the determined one or more optimum bands for dominant interfering base stations;

determining one or more worst PMIs based on the measurement; and determining a request set including interference information for each dominant interfering base station.

11. The method of claim 10, wherein the number of one or more worst PMIs is configured as larger for the cell boundary user equipment than for a non-cell-boundary user equipment.

12. A device for a user equipment to eliminate inter-cell interference in a multiple input multiple output (MIMO) wireless communication system, the device comprising:

an optimum band determining unit, within the user equipment, configured to:

identify bands not requested to be restricted from a neighboring cell, and determine one or more optimum bands among the identified bands according to a first period for updating the one or more optimum bands;

a request set determining unit, within the user equipment, configured to determine band and precoding matrix index (PMI) to be requested to be restricted to the neighboring cell among the determined one or more optimum bands according to a second period for updating the band and the PMI; and a feedback transmitter, within the user equipment, configured to transmit feedback information comprising the band and PMI to be requested to be restricted to the neighboring cell to a serving base station, wherein a length of the second period for updating the band and the PMI is smaller than a length of the first period for updating the one or more optimum bands.

13. The device of claim 12, wherein the optimum band determining unit updates the determined one or more optimum bands by configuring an update period of a band-PMI resource matrix as smaller than that of the optimum bands.

14. The device of claim 12, further comprising a band-PMI resource matrix information securing unit configured to receive a band-PMI resource matrix from the serving base station, wherein the optimum band determining unit identifies the bands not requested to be restricted from the neighboring cell based on the received band-PMI resource matrix.

15. The device of claim 14, further comprising a request set receiving unit configured to:

determine whether the user equipment itself is a cell boundary user equipment;

ignore the request for restricting use of band and PMI from the neighboring cell when it is determined that the user equipment is the cell boundary user equipment; and accept the request for restricting the use of band and PMI from the neighboring cell when it is determined that the user equipment is not the cell boundary user equipment.

16. The device of claim 15, wherein whether the user equipment itself is the cell boundary user equipment is determined by determining a position value using the equation:

$$\text{geometry} = \frac{I_{or}}{I_{oc} + \text{noise}}$$

where $I_{or}$ denotes an antenna gain separated by path loss from a serving cell and shadowing and corresponds to a long term channel power received from the serving cell, and $I_{oc}$ denotes a sum of the antenna gain separated by path loss from other cells and shadowing and corresponds to the long term channel power received from the other cells.

17. The device of claim 16, wherein the request set receiving unit is further configured to:
   determine that the user equipment is the cell boundary user equipment when the determined position value is smaller than a reference value; and
   determine that the user equipment is not the cell boundary user equipment when the determined position value is larger than or equal to the reference value.

18. The device of claim 15, wherein the number of the one or more optimum bands is configured as larger for the cell boundary user equipment than for a non-cell-boundary user equipment.

19. The device of claim 15, wherein the non-cell-boundary user equipment does not transmit the feedback information.

20. The device of claim 14, further comprising a request set receiving unit configured to:
   determine a group where the user equipment itself is included according to a position of the user equipment itself;
   ignore the request for restricting use of band and PMI from a first group user equipment or a second group user equipment of the neighboring cell when the user equipment itself is determined as the first group user equipment;
   accept the request for restricting the use of band and PMI from the first group user equipment or the second group user equipment of the neighboring cell when the user equipment itself is determined as the second group user equipment; and
   accept the request for restricting the use of band and PMI from the first group user equipment or the second group user equipment of the neighboring cell when the user equipment itself is determined as a third group user equipment,
   wherein the first group user equipment or the second group user equipment transmits the feedback information, and the third group user equipment does not transmit the feedback information.

21. The device of claim 12, wherein the request set determining unit measures interference for all neighboring cell PMIs on the determined one or more optimum bands for dominant interfering base stations, determines one or more worst PMIs based on the measurement, and then determines a request set including interference information for each dominant interfering base station for determining at least one of band and PMI to be requested to be restricted to the neighboring cell.

22. The device of claim 21, wherein the number of one or more worst PMIs is configured as larger for the cell boundary user equipment than for a non-cell-boundary user equipment.

* * * * *